United States Patent [19]

Stoffel

[11] Patent Number: 5,097,618
[45] Date of Patent: Mar. 24, 1992

[54] ELECTRONIC ICE FISHING SYSTEM

[76] Inventor: Boyd A. Stoffel, 1921 Hwy. 67 E., Campbellsport, Wis. 53010

[21] Appl. No.: 569,610

[22] Filed: Aug. 20, 1990

[51] Int. Cl.⁵ .............................................. A01K 85/01
[52] U.S. Cl. ......................................... 43/17; 43/17.1
[58] Field of Search .................................. 43/17, 17.1

[56] References Cited

U.S. PATENT DOCUMENTS

| | | | |
|---|---|---|---|
| 4,246,716 | 1/1981 | Elmer | 43/17 |
| 4,285,154 | 8/1981 | Grahl | 43/17 |
| 4,437,255 | 3/1984 | Reed | 43/17 |
| 4,633,608 | 1/1987 | Savarino | 43/17 |
| 4,928,419 | 5/1990 | Forrestal | 43/17 |
| 4,996,788 | 3/1991 | Wieting et al. | 43/17 |

FOREIGN PATENT DOCUMENTS 2802806  7/1979  Fed. Rep. of Germany .......... 43/17

*Primary Examiner*—Richard K. Seidel
*Assistant Examiner*—Patty Hong
*Attorney, Agent, or Firm*—Donald Cayen

[57] ABSTRACT

An electronic ice fishing system provides an enhanced alert to a fisherman of a fish strike. The electronic ice fishing system comprises an electric circuit with a radio transmitter and a magnetic reed switch encased in a weatherproof housing. The housing is attached to the frame of any of a number of conventional type fishing tipups. A ferrous plate is bonded to the housing proximate the magnetic reed switch inside. A magnet is placed on the ferrous plate, and the magnet actuates the magnetic reed switch to an open state. The magnet is tied with a cord to the flag alert of the tipup. When a fish strikes, the flag alert trips and pulls the magnet from the plate. As a result, the magnetic reed switch closes, and the radio transmitter is energized to signal a pager carried by the fisherman, who can be at a substantial distance and out of sight of his tipup. In a modified embodiment, the magnet and the plate are inverted. The magnet is captured inside the housing, and the plate is inserted into an external recess in the housing. The external recess is located between the magnet and the magnetic reed switch. When the plate is pulled from the housing recess by the tipup strike alert, the magnetic reed switch closes to energize the radio transmitter.

16 Claims, 3 Drawing Sheets

ELECTRONIC ICE FISHING SYSTEM

BACKGROUND OF THE INVENTION

1. Field of the Invention

This invention pertains to sports equipment, and more particularly to apparatus for ice fishing.

2. Description of the Prior Art

In the sport of ice fishing, the fisherman often attaches his line to a tipup of various kinds. Because of the outdoor conditions normally encountered, ice fishermen frequently leave their lines for short times while they warm up in a nearby vehicle, cottage, or shanty. To alert the temporarily absent fisherman of a fish strike on his line, the tipup usually includes a flag or similar component. When a fish hits the line, the flag is tripped from a lowered set position to a raised position, thus signalling the strike. Examples of such tipups may be seen in U.S. Pat. Nos. 3,196,570; 3,213,561; 3,807,078; 4,021,958; 4,285,154; and 4,565,024.

To provide alerts for night fishing, some tipups are modified to include an electric circuit that includes a lamp. A suitable mechanism operates to close the circuit when a fish strikes the line, thus illuminating the lamp. Such equipment is shown in U.S. Pat. Nos. 2,170,000; 2,785,493; 2,834,140; 3,078,610; 3,378,945; 4,272,297; and 4,633,608. Electrically operated sound devices, such as are included in the tipups shown in U.S. Pat. Nos. 4,633,608 and 4,246,716, eliminate the requirement that a fisherman constantly look at his tipup to known when a strike has occurred.

The tipup of U.S. Pat. No. 2,170,000 combines a radio transmitter and receiver with a light and a bell. In the tipups of U.S. Pat. Nos. 3,359,673 and 4,246,716, a magnetic reed switch is employed to close an electric circuit to actuate visual and audible signals. U.S. Pat. No. 4,437,255 describes a fish detecting system that utilizes a magnetic reed switch and a radio transmitter upon a fish strike.

While the aforementioned fishing devices have generally enjoyed commercial acceptance, they nevertheless possess several disadvantages. For example, in order for flag or light alerts to function successfully, the fisherman must almost constantly keep his tipup in his line of sight. In addition, the sounds from buzzers and bells often do not carry inside a vehicle or shanty.

A major drawback of the magnetic reed switch designs of the U.S. Pat. Nos. 3,359,673 and 4,246,716, as well as of the radio alert of the U.S. Pat. No. 2,170,000, is that those devices are custom designed for the particular tipups with which they are used. Alternatively, special tipups are required to suit the particular alert devices, which limits the versatility and usefulness of the alerts. The foregoing tipup and alert device combinations are therefore undesirably expensive.

Thus, a need exists for an improved ice fishing strike alert.

SUMMARY OF THE INVENTION

In accordance with the present invention, an electronic ice fishing system is provided that alerts an ice fisherman of a strike on his line in a more reliable and versatile manner than was previously possible. This is accomplished by apparatus that includes a radio transmitter that is attachable to and actuated by the existing components of a wide variety of inexpensive and conventional tipups.

The radio transmitter of the electronic ice fishing system is enclosed in a waterproof housing. The housing in turn is attached to a suitable part of the tipup frame that remains stationary on the ice during use. Also enclosed in the housing are a battery and a normally open magnetic reed switch connected by appropriate electrical circuitry. Preferably, an alert light and an on-off switch that is manually actuated from outside the housing are also included in the electric circuit.

The exterior of the housing wall is fabricated with a recess. The recess extends into the housing and is located between the magnetic reed switch and a magnet captured inside the housing. The recess is sized to loosely receive the metal plate of a key. When the key is inserted into the housing recess, the flux from the magnet is absorbed by the metal plate, and the magnet has no effect on the magnetic reed switch. Upon removal of the key from the housing recess, the magnet acts to close the magnetic reed switch and actuate the electrical circuit. As a consequence, the radio transmitter and electric lamp are energized. The radio transmitter sends signals that are received by a pager worn by the fisherman.

To remove the key from the housing recess and thus energize the radio transmitter, the present invention includes a flexible member such as a cord that has one end tied to the key. The cord second end is clipped to a structural component of the particular tipup that trips when a fish strikes the line. In many tipup designs, the tripable component is a flag, which is restrained at a lowered position when the tipup is set and that is tripped to rise to an upright position when a fish strikes. The cord is short enough such that when the flag rises it pulls the key from the housing recess. In that manner, the fisherman is alerted of a strike even if he can't see his tipup.

In a modified version of the present invention, the magnet and the key are inverted. A ferrous plate is permanently fastened to the outside of the housing at a location proximate a normally closed magnetic reed switch inside the housing. When a magnet is placed on and is attracted to the ferrous plate, the magnet and plate act together to maintain the magnetic reed switch in an open state. Upon removable of the magnet from the plate, the magnetic reed switch actuates to the closed state, and the electric circuit closes. The magnet is removed from the housing plate when a fish strikes by means of a cord tied between the magnet and the tipup tripable member. The operation of the electric circuit, including the radio transmitter and receiver, is the same as with the version with the captured magnet and the removable key.

Other advantages, benefits, and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
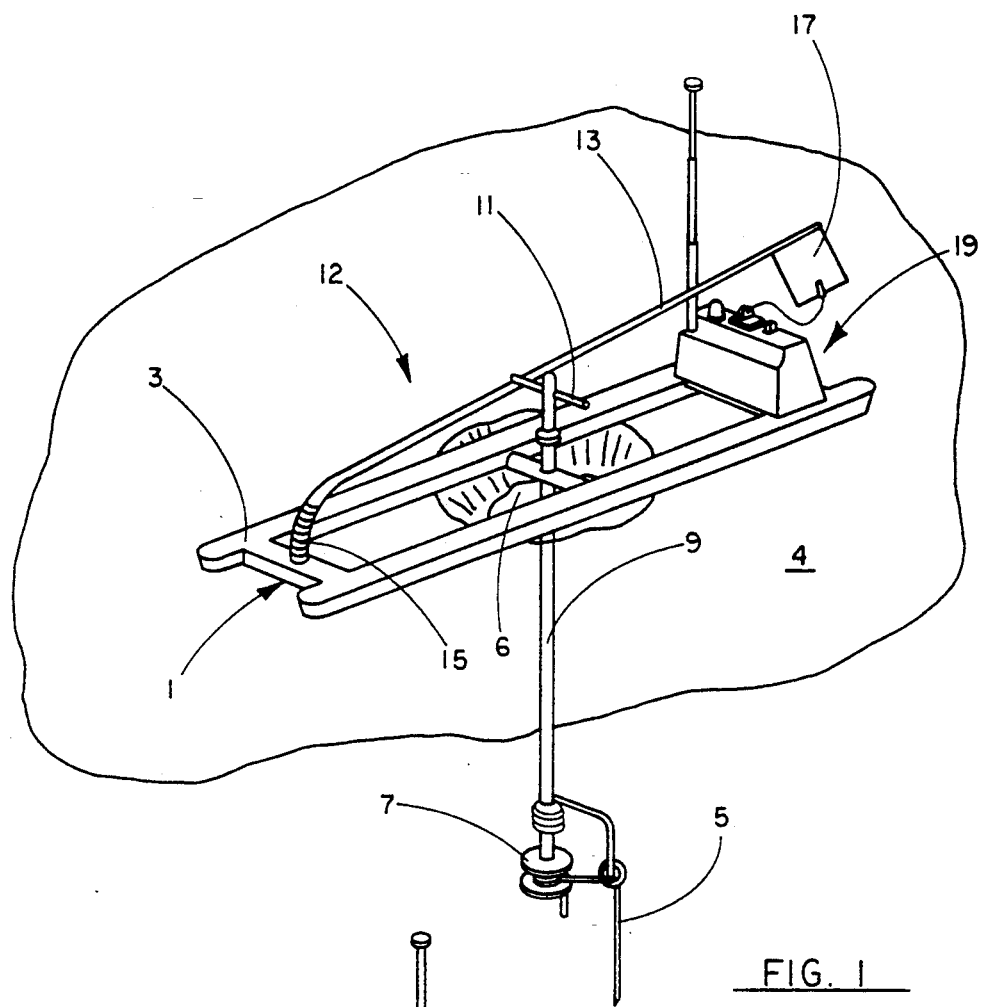
FIG. 1 is a perspective view of a typical conventional ice fishing tipup that is equipped with the electronic ice fishing system of the present invention.
Figure 2:
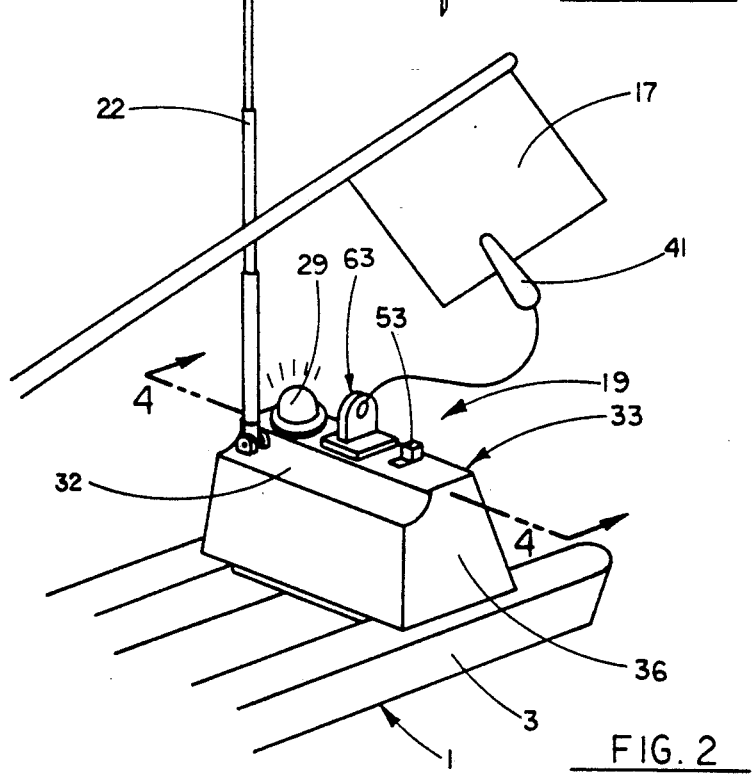
FIG. 2 is an enlarged view of a portion of the electronic ice fishing system according to the present invention fastened to a tipup.
Figures 3, 4:
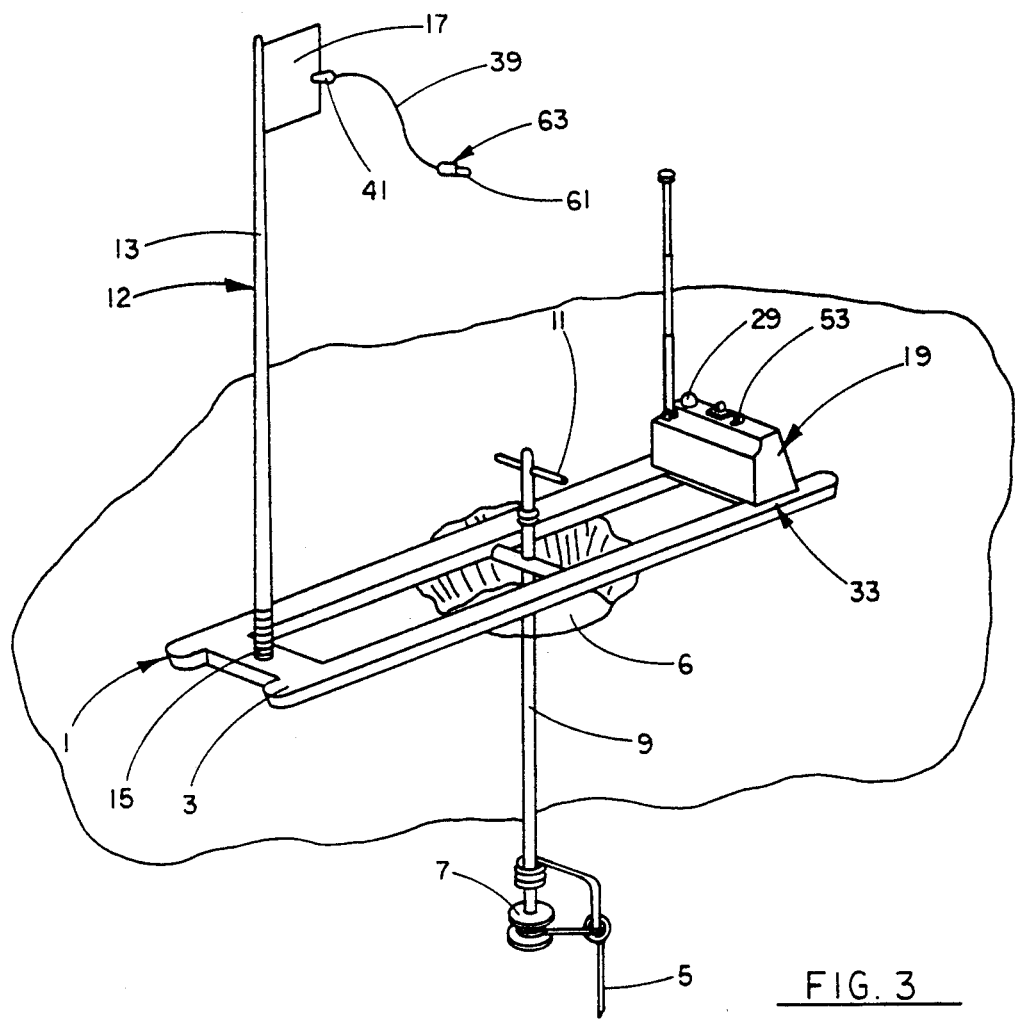
FIG. 3 is a view similar to FIG. 1, but showing the tipup in the tripped condition.
FIG. 4 is an enlarged longitudinal cross sectional view taken along lines 4—4 of FIG. 2.

Referring to FIGS. 1-3, an ice fishing tipup 1 is illustrated that includes the present invention. The particular tipup 1 shown is merely representative of a wide variety of ice fishing tipups with which the present invention can be utilized, and the tipup itself forms no part of the present invention.

The tipup 1 illustrated has a frame 3 that rests on the ice 4 and straddles a hole 6. A supply of fishing line 5 is wound on a reel 7. The reel 7 is supported on a shaft 9, which is mounted in the frame 3 for rotation about a vertical axis. To the upper end of the shaft 9 is fixed a horizontal arm 11.

The tipup 1 is provided with a signalling device in the form of a mechanical flag alert system 12. The flag alert system 12 includes a staff 13 that is flexibly connected at one end, as by a spring 15, to the frame 3. To the second end of the staff 13 is fixed a piece of bright colored material 17.

Figure 5:
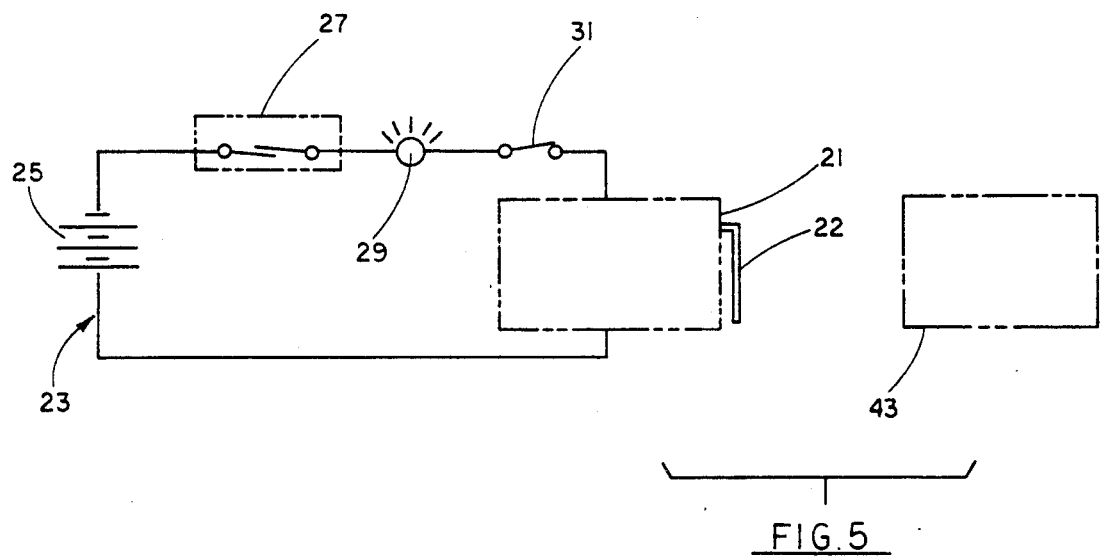
FIG. 5 is a schematic diagram of the electrical circuit of the present invention.

In accordance with the present invention, the tipup 1 is equipped with an electronic ice fishing system 19 that greatly enhances the strike alert given by the flag alert system 12. For that purpose, the electronic ice fishing system 19 comprises a radio signal transmitter. Looking at FIG. 5, the radio signal transmitter 21, including an antenna 22, forms a part of an electrical circuit 23. Other components of the electrical circuit 23 include a battery 25, a magnetic reed switch 27, a lamp 29, and a manually operated on-off switch 31. The foregoing components are enclosed in a waterproof housing 33, FIGS. 2 and 4. The lamp 29 and switch cap 53 of the manual switch 31 protrude through respective openings in the housing 33 in a weather proof manner. The antenna 22 may be a collapsible type that also swings to a stored position along side a depression 32 in the housing 33.

In the illustrated construction, the housing 33 is composed of a five-sided casing 36 that receives a printed circuit board 47. The printed circuit board 47 includes the radio transmitter 21, magnetic reed switch 27, and manual switch 31, as well as connections for the lamp 29. To set the frequency of the radio transmitter, a DIP switch 49 is included in the printed circuit board. Before the printed circuit board is assembled into the casing 36, a magnet 46 is pressed into a suitable compartment molded into the interior of the casing. A battery holder 38 and a battery door 44 cooperate with the casing 36 to complete the housing 33. The battery holder 38 snaps into indentations 42 in the inside walls of the casing 36, such that disassembly of the battery housing from the casing is quite difficult. Consequently, the printed circuit board 47 and its components are protected from misuse. A molded seal 45 around the battery holder and an O-ring 51 between the casing wall 57 and the manual switch cap 53 prevent moisture from entering the interior of the housing 33. A battery 25 is placed in the battery holder 38 and connected in known fashion to terminals 55, which in turn are connected by wires 56 to the printed circuit board. To provide access to the battery 25 and the DIP switch 49, the battery door 44 is relatively easy to remove from the battery holder 38 and the casing 36. The DIP switch 49 is set to match a conventional radio receiver or pager 43 (FIG. 5) that is worn by the fisherman using the tipup 1 and the electronic ice fishing system 19.

The top wall 57 of the casing 36 is formed with a rather deep rectangular recess 59. The recess 59 is located on the inside of the casing between the magnet 46 and the magnetic reed switch 27. A metal plate 61 of a key 63 fits loosely within the recess 59. The key 63 preferably has a non-metallic handle 65 with a hole 67 extending through the handle. The hole 67 is used to tie one end of a cord 39 to the key 63, FIG. 3. The second end of the cord 39 is tied to an alligator or similar clip 41.

The radio receiver or pager 43 used in connection with the electronic ice fishing system 19 may be any suitable commercially available product, and it forms no part of the present invention. The receiver is carried by the fisherman, such as in a pocket or on his belt. A number of radio transmitters 21 with their respective tipups 1 can be employed with a single pager by coding all the transmitters and the receiver to the same frequency with the DIP switch 49.

The housing 33 with the printed circuit board 47 and magnet 46 installed inside is attached to the tipup frame 3 by any suitable means, such as fasteners, pressure sensitive tape, or Velcro hook and eye tape, not shown. In the particular tipup 1 depicted, the housing is attached near the frame end opposite the staff 13 and spring 15. It will be appreciated that the particular location of the housing will vary to suit the particular tipup with which the electronic ice fishing system 19 is used.

The fisherman uses the tipup 1 in known manner. He baits his hook and sets the hook to the desired depth in the water. He then sets the flag alert system 12 by first bending the staff 13 to be approximately horizontal and rotates the shaft 9 such that the arm 11 overlies the staff. Upon releasing the staff, it is constrained to the horizontal position by the shaft arm, FIG. 1.

In addition to setting the tipup flag alert system 12, the fisherman also sets the electronic ice fishing system 19. That is achieved by inserting the metal plate 61 of the key 63 into the recess 59 of the housing casing 36, actuating the sliding switch 31 to the closed position by means of the switch cap 53, and clipping the clip 41 to the flag alert system material 17. With the key 63 inserted in the casing recess 59, the lines of magnetic flux from the magnet 46 pass through the key plate 61. Consequently, the magnet has no effect on the magnetic reed switch 27, which remains in its normally open condition.

When a fish strikes the bait, the line 5 is pulled to rotate the shaft 9 and remove the constraint of the arm 11 on the staff 13. Accordingly, the restoring force of the spring 15 raises the staff to the vertical position of FIG. 3, and the raised material 17 visually alerts the fisherman of the strike.

Simultaneously, the fisherman is aurally alerted by the electronic ice fishing system 19 of the fish strike. Aural alert is caused by signals transmitted from the energized radio transmitter 21 to the pager 43 worn by the fisherman. The radio transmitter is energized when the key 63 is pulled from the casing recess 59 by the raising of the flag staff 13 acting through the clip 41 and the cord 39. Removing the key and thus the metal plate 61 from the housing recess causes the lines of magnetic flux from the magnet 46 to act upon and close the magnetic reed switch 27. Thus, the fisherman, who temporarily may be as far as 100 yards and out of the line of sight of the tripped tipup 1, is alerted to the strike. For daytime fishing, the raised bright material 17 informs the fisherman of the particular tipup that the fish has struck. For night fishing, the glowing lamp 29 indicates the proper tipup. After determining the tipup that has been struck, the fisherman turns off his pager. He walks to the struck tipup, removes the clip 41 from the material 17, and reinserts the key 63 into the housing recess 59 to open the circuit 23 and to stop the radio signals.

After pulling in the fish, the fisherman resets his tipup as described previously. The electronic ice fishing system 19 is reset merely by reclipping the clip 41 to the material 17 (since the key 63 was previously inserted into the housing depression 59) and by turning the pager 23 back on and pressing its reset button. In that manner, the fisherman can temporarily leave his tipups with confidence that he will be alerted upon one of them being struck.

Figure 6:
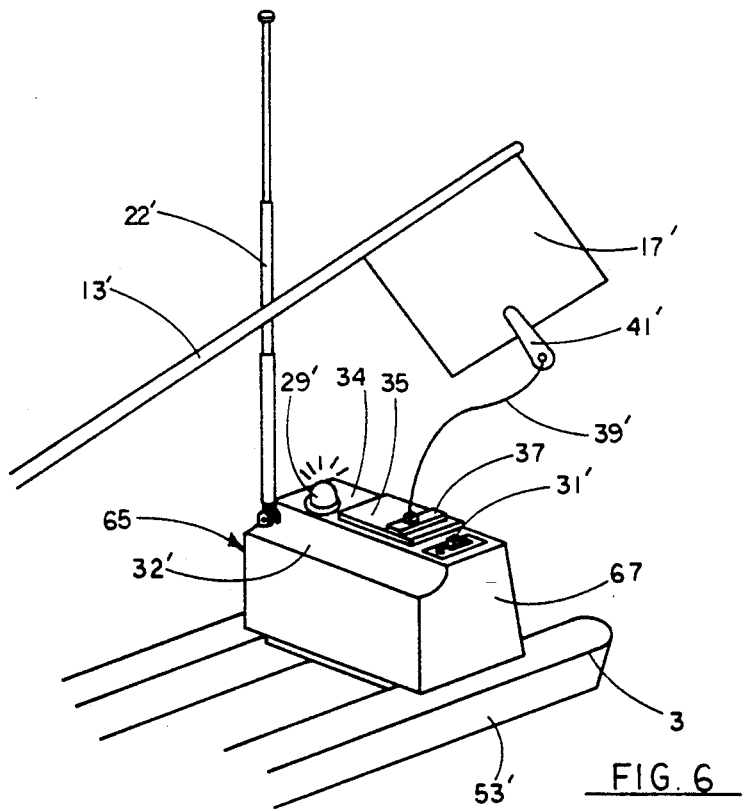
FIG. 6 is a view similar to FIG. 2, but showing a modified embodiment of the invention.

Turning to FIG. 6, a modified electronic ice fishing system 65 is illustrated. The electronic ice fishing system 65 is generally similar to the system 19 described previously in connection with FIGS. 1-5, and the system 65 is usable with the same varieties of tipups as the system 19. The system 65 has a housing 67 that is attachable to the tipup frame 3. Inside the housing 67 is an electronic printed circuit board that may be substantially similar to the printed circuit board 47, including a lamp 29', a battery, a normally closed magnetic reed switch, and a slide switch 31'. The electrical circuit of the ice fishing system 65 also includes a radio transmitter with a foldable antenna 22'. The housing 67 as a depression 32' for receiving the antenna 22' when the antenna is folded.

To the top wall 34 of the housing 67 is fastened a ferrous plate 35. The magnetic reed switch of the electronic ice fishing system 65 is located on the interior of the housing wall 34 proximate the ferrous plate 35. The magnetic reed switch is actuated between the opened and closed states by a magnet 37 in conjunction with the plate 35. When the magnet 37 is placed on the plate, the magnet and plate cooperate to hold the magnetic reed switch in the open state. When the magnetic is removed from the plate, the magnetic reed switch returns to the closed state, thereby energizing the lamp 29' and the radio transmitter, not shown in FIG. 6.

To remove the magnet 37 from the ferrous plate 35, the electronic ice fishing system 65 includes a relatively short flexible cord 39' having a first end that is tied to the magnet 37. The second end of the cord 39' is tied to an alligator or similar trip 41'. Upon a fish striking and the resulting raising of the flag alert system staff 13', the material 17' acts through the clip 41' and cord 39' to pull the magnet from the plate 35.

Thus, it is apparent that there has been provided, in accordance with the invention, an electronic ice fishing system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In combination with an ice fishing tipup having a frame and a flag alert system operable between set and tripped conditions,
   an electronic ice fishing system comprising:
   a. a housing attached to the tipup frame and having walls that define an interior space and that have respective exterior surfaces;
   b. a ferrous plate fastened to the exterior of a selected housing wall;
   c. a magnetic reed switch installed in the housing interior space proximate the ferrous plate, the magnetic reed switch being actuable between opened and closed states;
   d. a radio transmitter installed in the housing interior space;
   e. circuit means inside the housing space for energizing the radio transmitter when the magnetic reed switch is actuated to the closed state; and
   f. magnet means for closing the magnetic reed switch in response to actuation of the tipup flag alert system from the set to the tripped conditions to thereby energize the circuit means and energize the radio transmitter.

2. The combination of claim 1 wherein the magnet means comprises a magnet selectively placed on and removed from the ferrous plate, the magnet actuating the magnetic reed switch to the open state when the magnet is placed on the ferrous plate, the magnetic reed switch actuating to the closed state when the magnet is removed from the ferrous plate.

3. The combination of claim 2 wherein the magnet means further comprises cord means for tieing the magnet to the tipup flag alert system,
   so that tripping the tipup flag alert system causes the cord means to pull the magnet from the ferrous plate and thereby close the magnetic reed switch.

4. Ice fishing apparatus comprising:
   a. a frame;
   b. flag alert means connected to the frame for operating between a set condition and a tripped condition;
   c. a housing attached to the frame and having an interior and exterior;
   d. an electric circuit inside the housing interior and including a magnetic reed switch and a radio transmitter; and
   e. magnet means tied to the flag alert means and placed adjacent the housing exterior proximate the magnetic reed switch inside thereof when the flag alert means is in the set condition for actuating the magnetic reed switch between an open and a closed state in response to the placement of the magnet means, the electrical circuit being closed to energize the radio transmitter when the magnet means is removed from adjacent the housing by the flag alert means operating to the tripped condition.

5. The apparatus of claim 4 wherein:
   a. a ferrous plate is fastened to the housing exterior proximate the magnetic reed switch installed in the housing interior; and
   b. the magnet means is selectively placed on the ferrous plate to actuate the magnetic reed switch to the open state.

6. The apparatus of claim 4 wherein the magnet means comprises:

a. a magnet selectively placed on the housing exterior proximate the magnetic reed switch in the housing interior; and b. cord means tied between the magnet and the flag alert means for pulling the magnet from the housing exterior in response to the flag alert means operating from the set condition to the tripped condition.

7. Apparatus for catching fish comprising:
a. a frame;
b. first alert means connected to the frame for operating from a set condition to a tripped condition in response to a fish strike; and
c. second alert means attached to the frame for signalling the fish strike comprising:
   i. an electrical circuit including a magnetic reed switch and a radio transmitter;
   ii. housing means attached to the frame for enclosing the electrical circuit; and
   iii. magnet means tied to the first alert means for being placed on the housing means proximate the magnetic reed switch enclosed therein to actuate the magnetic reed switch and the electrical circuit to an open state when the first alert means is in the set condition and for being pulled from the housing means by the first alert means in response to a fish strike, the electrical circuit and the magnetic reed switch being actuated to a closed state to energize the radio transmitter when the magnet means is pulled from proximate the magnetic reed switch.

8. The apparatus of claim 7 wherein the housing means comprises:
a. a non-metallic housing attached to the frame; and
b. a ferrous plate fastened to the housing proximate the magnetic reed switch installed inside thereof, the magnet means being placed on the ferrous plate when the magnet means is placed on the housing.

9. The apparatus of claim 7 wherein the magnet means comprises:
a. a magnet; and
b. a cord having a first end tied to the magnet and a second end tied to the first alert means,
so that operation of the first alert means from the set to the tripped conditions pulls the cord to pull the magnet from the housing.

10. A method of signalling a fish strike comprising the steps of:
a. providing a tipup having a frame and a strike alert system operable between a set condition and a tripped condition;
b. attaching an electrical circuit having a magnetic reed switch and a radio transmitter to the tipup frame;
c. operating the tipup strike alert system to the set condition;
d. tieing one end of a cord to a magnet and the other end to the strike alert system;
e. placing the magnet proximate the magnetic reed switch thereby actuating the magnetic reed switch to an open state;
f. operating the strike alert system to the tripped condition; and
g. tightening the cord with the strike alert system and pulling the magnet from the proximity of the magnetic reed switch to thereby energize the electric circuit and energize the radio transmitter.

11. The method of claim 10 wherein the step of placing the magnet proximate the magnetic reed switch comprises the steps of:
a. locating a ferrous plate adjacent the magnetic reed switch; and
b. placing the magnet on the ferrous plate.

12. An electronic ice fishing system comprising:
a. a housing having a plurality of walls that define an interior, one of the walls being fabricated with a blind recess that extends into the housing interior;
b. a magnetic reed switch in the housing interior proximate the housing wall recess, the magnetic reed switch being actuable between opened and closed states;
c. a radio transmitter installed in the housing interior;
d. circuit means for electrically connecting the radio transmitter and the magnetic reed switch and for energizing the radio transmitter in response to closing of the magnetic reed switch;
e. a magnet captured in the housing interior with the housing recess being interposed between the magnet and the magnetic reed switch; and
f. plate means for being selectively inserted into the housing recess to maintain the magnetic reed switch in the open state and for being selectively removed from the housing recess to close the magnetic reed switch and thereby energize the radio transmitter.

13. In combination with an ice fishing tipup having a frame and a flag alert system that is operable between a set condition and a tripped condition,
an electronic ice fishing system comprising:
a. a housing having an interior and being mounted to the tipup frame, the housing having a wall that defines a recess therein;
b. a magnet captured in the housing interior proximate the housing wall recess;
c. a magnetic reed switch inside the housing with the housing recess being interposed between the magnetic reed switch and the magnet;
d. a radio transmitter inside the housing interior;
e. circuit means for energizing the radio transmitter in response to closing of the magnetic reed switch; and
f. key means tied to the flag alert system for being inserted into the housing recess when the flag alert system is in the set condition to prevent the magnet from affecting the magnetic reed switch and for being pulled out of the housing recess in response to the flag alert system being tripped to cause the magnet to close the magnetic reed switch and thereby close the circuit means to energize the radio transmitter.

14. The combination of claim 13 wherein the key means comprises:
a. a key having a metal plate for inserting into the housing recess;
b. a cord having a first end tied to the key; and
c. a clip tied to the cord second end, the clip being clipped to the flag alert system,
so that operation of the flag alert system to the tripped condition pulls the key from the housing recess.

15. Apparatus for catching fish comprising:
a. a frame;
b. flag alert means connected to the frame for operating between a set condition and a tripped condition;

c. a housing having a wall that defines an interior space, the housing being attached to the frame, the housing wall having an external recess therein;

d. a magnet captured in the housing interior space proximate the external recess;

e. a magnetic reed switch inside the housing interior space with the housing external recess being interposed between the magnet and the magnetic reed switch;

f. a radio transmitter inside the housing interior space;

g. circuit means inside the housing interior space for electrically connecting the magnetic reed switch and the radio transmitter; and h. key means for being inserted into the housing external recess when the flag alert means is in the set condition and for being pulled from the housing external recess by the flag alert means when the flag alert means operates to the tripped condition, the key means preventing actuation of the magnetic reed switch when the key means is inserted into the housing external recess and allowing the magnet to act on the magnetic reed switch when the key means is pulled from the housing external recess, so that the magnetic reed switch actuates to energize the radio transmitter when the key means is pulled from the housing external recess.

16. A method of signalling a fish strike comprising the steps of:

a. providing a tipup having a frame and a strike alert operable between set and tripped conditions;

b. providing a housing that defines an interior space and an external recess;

c. installing an electrical circuit having a magnetic reed switch and a radio transmitter inside the housing interior space;

d. capturing a magnet in the housing interior space with the housing external recesses being located between the magnetic reed switch and the magnet;

e. inserting a metal plate into the housing external recess to thereby prevent the magnet from acting on the magnetic reed switch;

f. placing the strike alert to the set condition;

g. tieing the metal plate to the strike alert;

h. operating the strike alert to the tripped condition; and i. pulling the metal plate from the housing external recess with the strike alert to thereby cause the magnet to act on the magnetic reed switch to energize the radio transmitter.

* * * * *